US007672886B2

(12) United States Patent
Bent et al.

(10) Patent No.: US 7,672,886 B2
(45) Date of Patent: Mar. 2, 2010

(54) SYSTEMS AND METHODS FOR MANAGING CLIENT ACCOUNTS

(75) Inventors: Bruce Bent, Manhasset, NY (US); Bruce Bent, II, New York, NY (US)

(73) Assignee: Island Intellectual Property LLC, New York, NY (US)

( * ) Notice: Subject to any disclaimer, the term of this patent is extended or adjusted under 35 U.S.C. 154(b) by 1179 days.

(21) Appl. No.: 11/149,278

(22) Filed: Jun. 10, 2005

(65) Prior Publication Data

US 2005/0228733 A1 Oct. 13, 2005

Related U.S. Application Data

(60) Division of application No. 09/677,535, filed on Oct. 2, 2000, which is a continuation-in-part of application No. 09/176,340, filed on Oct. 21, 1998, now Pat. No. 6,374,231.

(51) Int. Cl.
*G06Q 40/00* (2006.01)

(52) U.S. Cl. .............................. 705/35; 705/39; 705/40; 235/379

(58) Field of Classification Search ................. 235/379; 705/4, 35, 38, 40, 42, 39
See application file for complete search history.

(56) References Cited

U.S. PATENT DOCUMENTS

| | | | |
|---|---|---|---|
| 4,232,367 A | 11/1980 | Youden et al. | |
| 4,346,442 A | 8/1982 | Musmanno | |
| 4,376,978 A | 3/1983 | Musmanno | |
| 4,597,046 A | 6/1986 | Musmanno | |
| 4,674,044 A | 6/1987 | Kalmus | |
| 4,694,397 A | 9/1987 | Grant | |

(Continued)

FOREIGN PATENT DOCUMENTS

JP 10049590 2/1998

(Continued)

OTHER PUBLICATIONS

12 CFR Part 329—Interest on Deposit. Source: 51 FR 10808. Mar. 31, 1986 (5 pages).*

(Continued)

*Primary Examiner*—James P Trammell
*Assistant Examiner*—B. Joan Amelunxen
(74) *Attorney, Agent, or Firm*—Foley & Lardner LLP (57) ABSTRACT

Providing interest to clients' deposited funds without limitation on the number of demand withdrawals from deposit accounts is accomplished by an administration system that keeps all of the records for the clients' deposits and withdrawals, calculates the total of the deposits and withdrawals for all clients, and uses the calculation to determine whether funds are deposited to or withdrawn from one or more deposit accounts in which all clients' deposit funds are kept. Clients can make unlimited withdrawals, such as by check, credit card, debit card, or electronic transfer, through the administrator. By placing the administrator as the holder of the deposit account(s), exemptions to the limitation on earning interest in demand accounts is facilitated; additionally, dispersing the deposit account funds among multiple banks allows the client to obtain FDIC insurance for all of the deposited funds, which may amount to insurance in excess of the statutory maximum allowed (presently $100,000.00).

13 Claims, 4 Drawing Sheets

U.S. PATENT DOCUMENTS

| | | | |
|---|---|---|---|
| 4,700,297 A | 10/1987 | Hagel | |
| 4,751,640 A | 6/1988 | Lucas et al. | |
| 4,774,663 A | 9/1988 | Musmanno | |
| 4,953,085 A | 8/1990 | Atkins | |
| 4,985,833 A * | 1/1991 | Oncken | 705/42 |
| 5,126,936 A | 6/1992 | Champion et al. | |
| 5,206,803 A | 4/1993 | Vitagliano | |
| 5,220,501 A * | 6/1993 | Lawlor et al. | 705/40 |
| 5,235,507 A | 8/1993 | Sacklera | |
| 5,262,942 A | 11/1993 | Earled | |
| 5,270,922 A | 12/1993 | Higginsg | |
| 5,291,398 A * | 3/1994 | Hagan | 705/4 |
| 5,297,032 A | 3/1994 | Trojand | |
| 5,424,938 A | 6/1995 | Wagner et al. | |
| 5,631,828 A | 5/1997 | Hagan | |
| 5,644,727 A * | 7/1997 | Atkins | 705/40 |
| 5,671,363 A | 9/1997 | Cristofich | |
| 5,689,650 A | 11/1997 | McClelland | |
| 5,710,889 A | 1/1998 | Clark | |
| 5,765,144 A | 6/1998 | Larche | |
| 5,774,880 A | 6/1998 | Ginsberg | |
| 5,781,654 A | 7/1998 | Carney | |
| 5,806,048 A | 9/1998 | Kiron et al. | |
| 5,806,049 A | 9/1998 | Petruzzi | |
| 5,812,987 A | 9/1998 | Luskin | |
| 5,826,243 A | 10/1998 | Musmanno | |
| 5,852,811 A | 12/1998 | Atkins | |
| 5,864,685 A * | 1/1999 | Hagan | 705/35 |
| 5,878,258 A | 3/1999 | Pizia | |
| 5,878,405 A | 3/1999 | Grant et al. | |
| 5,884,285 A | 3/1999 | Atkins | |
| 5,890,141 A | 3/1999 | Carney | |
| 5,893,078 A * | 4/1999 | Paulson | 705/35 |
| 5,903,881 A | 5/1999 | Schrader et al. | |
| 5,905,974 A | 5/1999 | Fraser | |
| 5,940,809 A | 8/1999 | Musmanno | |
| 5,941,996 A | 8/1999 | Smith | |
| 5,946,667 A | 8/1999 | Tull et al. | |
| 5,950,175 A | 9/1999 | Austin | |
| 5,974,390 A | 10/1999 | Ross | |
| 5,978,779 A | 11/1999 | Stein | |
| 6,014,642 A | 1/2000 | El-Kadi et al. | |
| 6,016,482 A | 1/2000 | Molinari | |
| 6,026,438 A | 2/2000 | Piazza | |
| 6,041,314 A | 3/2000 | Davis | |
| 6,044,371 A | 3/2000 | Person | |
| 6,047,324 A | 4/2000 | Ford | |
| 6,049,782 A | 4/2000 | Gottesman et al. | |
| 6,052,673 A | 4/2000 | Leon et al. | |
| 6,088,685 A | 7/2000 | Kiron et al. | |
| 6,092,056 A | 7/2000 | Tull et al. | |
| 6,105,005 A | 8/2000 | Fuhrer | |
| 6,108,641 A | 8/2000 | Kenna | |
| 6,112,191 A | 8/2000 | Burke | |
| 6,119,093 A * | 9/2000 | Walker et al. | 705/4 |
| 6,131,810 A | 10/2000 | Weiss | |
| 6,154,770 A | 11/2000 | Kostakos | |
| 6,189,785 B1 * | 2/2001 | Lowery | 235/379 |
| 6,226,623 B1 | 5/2001 | Schein et al. | |
| 6,317,783 B1 | 11/2001 | Freishtat et al. | |
| 6,374,231 B1 | 4/2002 | Bent et al. | |
| 6,970,843 B1 | 11/2005 | Forte | |
| 7,089,202 B1 | 8/2006 | McNamar et al. | |
| 7,103,556 B2 | 9/2006 | Del Rey et al. | |
| 7,133,840 B1 | 11/2006 | Kenna et al. | |
| 7,206,761 B2 | 4/2007 | Colvin | |
| 7,216,100 B2 | 5/2007 | Elliott | |
| 7,376,606 B2 | 5/2008 | Jacobsen | |
| 7,383,223 B1 | 6/2008 | Dilip et al. | |
| 7,440,914 B2 | 10/2008 | Jacobsen | |
| 7,509,286 B1 * | 3/2009 | Bent et al. | 705/39 |
| 2001/0032182 A1 | 10/2001 | Kumar et al. | |
| 2002/0007330 A1 | 1/2002 | Kumar et al. | |
| 2002/0069147 A1 | 6/2002 | Sheehan et al. | |
| 2002/0091637 A1 | 7/2002 | Bent et al. | |
| 2002/0128951 A1 | 9/2002 | Kiron et al. | |
| 2002/0161707 A1 | 10/2002 | Cole et al. | |
| 2002/0165757 A1 | 11/2002 | Lisser | |
| 2002/0178098 A1 | 11/2002 | Beard | |
| 2003/0023529 A1 | 1/2003 | Jacobsen | |
| 2003/0135437 A1 | 7/2003 | Jacobsen | |
| 2003/0149646 A1 | 8/2003 | Chen et al. | |
| 2003/0163403 A1 | 8/2003 | Chen et al. | |
| 2003/0177092 A1 | 9/2003 | Paglin | |
| 2003/0191702 A1 | 10/2003 | Hurley | |
| 2003/0236728 A1 | 12/2003 | Sunderji et al. | |
| 2004/0039674 A1 | 2/2004 | Coloma | |
| 2004/0107157 A1 | 6/2004 | Bleunven et al. | |
| 2004/0111361 A1 | 6/2004 | Griffiths et al. | |
| 2004/0128229 A1 | 7/2004 | Raines et al. | |
| 2004/0128235 A1 | 7/2004 | Kemper et al. | |
| 2004/0138974 A1 | 7/2004 | Shimamura et al. | |
| 2004/0153398 A1 | 8/2004 | Baumgartner et al. | |
| 2004/0162773 A1 | 8/2004 | Del Rey et al. | |
| 2004/0177036 A1 | 9/2004 | Nutahara et al. | |
| 2005/0044038 A1 | 2/2005 | Whiting et al. | |
| 2005/0091137 A1 | 4/2005 | Woeber | |
| 2005/0102225 A1 | 5/2005 | Oppenheimer et al. | |
| 2005/0102226 A1 | 5/2005 | Oppenheimer et al. | |
| 2005/0108120 A1 | 5/2005 | Malka et al. | |
| 2005/0108149 A1 | 5/2005 | Bent et al. | |
| 2005/0114246 A1 | 5/2005 | Coloma | |
| 2005/0154662 A1 | 7/2005 | Langenwalter | |
| 2005/0228733 A1 | 10/2005 | Bent et al. | |
| 2006/0047593 A1 | 3/2006 | Naratil et al. | |
| 2006/0106703 A1 | 5/2006 | Del Rey et al. | |
| 2006/0155644 A1 | 7/2006 | Reid et al. | |
| 2006/0167773 A1 | 7/2006 | Yang et al. | |
| 2006/0213980 A1 | 9/2006 | Geller et al. | |
| 2006/0273152 A1 | 12/2006 | Fields | |
| 2007/0043666 A1 | 2/2007 | Burdette | |
| 2007/0118449 A1 | 5/2007 | De La Motte | |
| 2007/0255655 A1 | 11/2007 | Kemper et al. | |
| 2007/0271174 A2 * | 11/2007 | Bent et al. | 705/38 |
| 2007/0276752 A1 | 11/2007 | Whiting et al. | |
| 2007/0288400 A1 | 12/2007 | Menon | |
| 2008/0015985 A1 | 1/2008 | Abhari et al. | |
| 2008/0046358 A1 | 2/2008 | Holm-Blagg et al. | |
| 2008/0065532 A1 | 3/2008 | De La Motte | |
| 2008/0097899 A1 | 4/2008 | Jackson et al. | |
| 2008/0120228 A1 | 5/2008 | Bent et al. | |
| 2008/0133280 A1 | 6/2008 | Ziegler | |
| 2008/0133396 A1 | 6/2008 | De La Motte | |
| 2009/0006985 A1 | 1/2009 | Fong et al. | |
| 2009/0012899 A1 | 1/2009 | Friesen | |

FOREIGN PATENT DOCUMENTS

| | | |
|---|---|---|
| WO | WO 95/23379 | 8/1995 |
| WO | WO-99/18529 | 4/1999 |
| WO | WO-02/42952 | 5/2002 |
| WO | WO-03/012580 | 2/2003 |
| WO | WO-2005/006111 | 1/2005 |

OTHER PUBLICATIONS

Mutual Funds, Oct. 1997 issue, "Where your Interest is". Bruce Bent, President The Reserve Funds, p. 32 (2 pages).*

Federal Register, Oct. 9, 1997 (vol. 62, No. 196), pp. 52809-52868—http://www.fdic.gov/news/news/inactivefinancial/1997/fil97111b.html.*

12 CFR Ch 1, Section 7.1012, Messenger service (Jan. 1, 2006 Ed.), pp. 132-133.*

Bent, "Bruce Bent Makes Money Market Funds Act Like Bank Accounts," Equity BBDP, Oct. 5, 1998, 3 Sheets.

Mutual Funds Magazine, Bargain Basement Funds, Oct. 1997, 2 Sheets.

Mutual Funds Magazine, Bargain Basement Funds, Oct. 1997, 1 Sheet.

Money Fund Report, IBC Financial Data, Inc., Nov. 6, 1998, 1 Sheet.

Liberman et al., Market Watch, "How Important are Banks?" FDIC Insurance on Deposits Just One Continuing Advantage, Oct. 17, 2006, 3 Sheets.

Declaration of Mr. Bruce Bent II, Vice Chairman and Registrant of Applicant. (3 Sheets) and Exhibits A, B, C and D (6 Sheets).

Capital Briefs: Corporate Checking Account Relief Sought, American Banker, vol. 162, Jul. 28, 1997, 1 Sheet.

Letter From Jamey Basham, Attorney, LEXSEE 1990 FDIC Interp. Ltr., Lexis 1, Federal Deposit Insurance Corporation, FDIC-90-02, Jan. 3, 1990, 2 Sheets.

Letter From Colleen Curran Harvey, Deputy Chief Counsel, Jan. 8, 1985; Letter From Merle Y. Waldman, Nov. 14, 1984; Letter From Merle Y. Waldman, Sep. 24, 1984; Letter From Merle Y. Waldman, Aug. 8, 1984, LEXSEE 1985 Sec No- Act., Lexis 1593, Securities Exchange Act of 1934—Section 15(a), 11 Sheets.

The Insured Savings Account, Issuer Guide to Offering MMDAs Through Merrill Lynch, Merrill Lynch Money Markets, Inc., "Operational Guide to the Merrill Lynch MMDA Program 1986", Sep. 1986 3 Sheets.

FDIC Federal Register Citations: Email from Bert Ely to Comments, Mar. 8, 2006, Subject: Large-Bank Deposit Insurance Determination Proposal- RIN 3064-AC98—Regs@fdic.gov. Attached, also from FDIC Federal Register Citations: Email From American Banker, by Bert Ely, Feb. 24, 2006, Viewpoint: FDIC's Account-Link Plan a Pointless, Costly Threat.

U.S. Appl. No. 60/307,815, filed Jul. 27, 2001.

U.S. Appl. No. 60/323,365, filed Sep. 20, 2001.

Letter From William W. Wiles, Secretary of the Board, Board of Governors of the Federal Reserve System, Jun. 22, 1983, 6 Sheets.

DI 48, Excerpts of Transcript of Hearing, U.S. Dist. Ct., District of Delaware, Civil Action No. 82-680, Apr. 8, 1983, 5 sheets.

DI 56, Interrog. Response, U.S. Dist. Ct. District of Delaware, Civil Action No. 82-680, May 20, 1983, 15 Sheets.

DI 99, Suppl. Interrogatory Response, U.S. Dist. Ct., District of Delaware, Civil Action No. 82-630, May 30, 1984, 6 Sheets.

Letter from Michael Bradfield, General Counsel, Board of Governors of the Federal Reserve System, Nov. 16,1984, 4 Sheets.

Board of Governors of the Federal Reserve System, 1984 Fed. Res. Interp. Ltr. LEXIS 56, Nov. 16, 1984, 3 Sheets.

Letter From Oliver I. Ireland, Associate General Counsel, Board of Governors of the Federal Reserve System, Jun. 22, 1988, 5 Sheets.

Board of Governors of the Federal Reserve System, 1988 Fed. Res. Interp. Ltr. LEXIS 141, Jun. 22, 1988, 3 Sheets.

Board of Governors of the Federal Reserve System, 1989 Fed. Res. Interp. Ltr. LEXIS 77, Mar. 14, 1989, 2 Sheets.

Board of Governors of the Federal Reserve System, 1989 Fed. Res. Interp. Ltr. LEXIS 154, Jun. 21, 1989, 2 Sheets.

Board of Governors of the Federal Reserve System, 1990 Fed. Res. Interp. Ltr. LEXIS 94, Feb. 1, 1990, 1 Sheet.

Board of Governors of the Federal Reserve System, 1991 Fed. Res. Interp. Ltr. LEXIS 232, Jan. 30, 1991, 2 Sheets.

CMA, The Merrill Lynch Cash Management Account Financial Service, Insured Savings Account Participating Depository Institutions, Merrill Lynch, Pierce, Fenner & Smith Incorporated, Nov. 1992, 2 Sheets.

Board of Governors of the Federal Reserve System, 1994 Fed. Res. Interp. Ltr. LEXIS 156, Jun. 24, 1994, 3 Sheets.

CMA, Insured Savings Account Fact Sheet, Merrill Lynch, Pierce, Fenner & Smith Incorporated, Jul. 1994, pp. 47-54.

Board of Governors of the Federal Reserve System, 1994 Fed. Res. Interp. Ltr. LEXIS 314, Oct. 17, 1994, 2 Sheets.

Board of Governors of the Federal Reserve System, 1994 Fed. Res. Interp. Ltr. LEXIS 419, Oct. 14, 1994, 4 Sheets.

CMA, The Merrill Lynch Cash Management Account Financial Service, Insured Savings Account Participating Depository Institutions, Merrill Lynch, Pierce, Fenner & Smith Incorporated, Mar. 1995, 2 Sheets.

Letter from Stephanie Martin, Assoc. General Counsel, Board of Governors of the Federal Reserve System, Apr. 22, 2004, 8 Sheets.

Bank Deposit Program, Online http://web.archive.org/web/20030620100115/http:/www.smithbarney.com/products_servi, Jan. 19, 2001, 4 Sheets.

U.S. Appl. No. 10/825,440, filed Apr. 14, 2004, Bent et al.

Announcing Changes in Automatic "Sweep" Investment Options, LPL Financial Services, Linsco/Private Ledger, Member NASD/SIPC, 26 Sheets.

Insured Cash Account Program Disclosure Booklet, LPL Financial Services, Linsco/Private Ledger, Member NASD/SIPC, 14 Sheets.

California Independent Bankers, ICBA Independent Community Bankers of America, Banker Bulletin, 2006, CIB $16^{th}$ Annual Convention, vol. 4, Issue 6, http://www.cib.org/banker_bulletin.htm, 2 Shhets.

AB 2011 Assembly Bill—Chaptered, http://www.leginfo.ca.gov/pub/bill/asm/ab_2001-2050/ab$_{13}$ 2011_bill_20060925_chaptered.html, 2006, pp. 1-3.

AB 2011 Assembly Bill—Enrolled, http://www.leginfo.ca.gov/pub/bill/asm/ab_2001-2050/ab_2011_bill_20060816_enrolled.html, 2006, pp. 1-3.

AB 2011 Assembly Bill—History, Complete Bill History, http://www.leginfo.ca.gov/pub/bill/asm/ab_ 2001-2050/ab_2011_bill_20060925_history.html, 2006, p. 1.

AB 2011 Assembly Bill—Bill Analysis, Senate Amendments, http://www.leginfo.ca.gov/pub/bill/asm/ab_ 2001-2050/ab_2011_cfa_20060811_161755_asm_floor.html, 2006, pp. 1-3.

AB 2011 Assembly Bill—Bill Analysis, Senate Rules Committee, Third Reading, http://www.leginfo.ca.gov/pub/bill/asm/ab_2001-2050/ab_2011_cfa_ 20060705_161454_sen_floor.html, 2006, pp. 1-7.

The Reserve Funds Press Release "The Reserve Funds and Frontier Bank Partner to Offer Revolutionary Banking Product," 5 Sheets, Aug. 1, 2000.

Anderson et al. "Retail Sweep Programs and Bank Reserves," Federal Reserve Bank of St. Louis Review, Bell & Howell Information and Learning Company, vol. 83, Issue 1, 24 Sheets, Jan. 1, 2001.

Declaration of Mr. Bruce Bent II, Vice Chairman and Registrant of Applicant on the date of first commercial use of the service providing interest and FDIC insurance for checking accounts by means of a system using money market deposit accounts (MMDA's) of Oct. 23, 1997.

Britt, "Struggling with Sweep Accounts," America's Community Banker, vol. 6, No. 12, 11 Sheets, Dec. 1, 1997.

Chapelle, "Merrill's Rivals Say They, Too. Offer Services Beyond Banking," Securities Data Publishing on Wall Street, 2 Sheets, Feb. 1, 2003.

Chapelle et al. "Peering Into Tomorrow: At the Threshold of a New Century, Brokers and Others Discuss Where They were Going," Securities Data Publishing on Wall Street, 6 Sheets, Dec. 1, 1999.

Coyle, "A Look at commercial Demand Deposit Options," America's Community Banker, vol. 9, Issue 2, Bell & Howell Information and Learning Company, 9 Sheets, Feb. 1, 2000.

Crockett, "Big Banks Found Stepping Up Marketing of 'Sweep' Accounts," American Banker, vol. 159, No. 198, American Banker Inc., 3 Sheets, Oct. 13, 1994.

Fredrickson, "Rising Rates Rescue Money Fund Firm Reserve Profits by Picking Niches," Crain's New York Business, Crain Communications Inc., vol. 20, Issue 51, 2 Sheets, Dec. 20, 2004.

Hoffman, "Reserve's FDIC-Insured Account Draws Regionals; But some see little need for insurance," Crain Communications Inc., Investment News, 2 Sheets, Jun. 4, 2001.

Keenan, "Tapping Brokerages for Alternative to CDs," American Banker, The Financial Services Daily, 3 Sheets, Feb. 18, 2004.

Lavine, "Check Out High-Yield Checking Accounts," Broward Daily Business Review, vol. 39, No. 102, 2 Sheets, Apr. 27, 1998.

McReynolds, "The Power of Cash: Ho-hum cash can be great product (and lead to more business) in troubled times," Securities Data Publishing on Wall Street, 3 Sheets, Jun. 1, 2002.

McReynolds et al. "Unusual Products for Unusual Times," Securities Data Publishing on Wall Street, 6 Sheets, May 1, 2001.

Potter, "As Sweep Accounts Continue to Grow, So do Community Bank Options," America's Community Banker, vol. 9, Issue 8, Bell & Howell Information and Learning Company, 3 Sheets, Aug. 1, 2000.
Share, "New Service Skirts FDIC's $100K Limit," Dialog Web Command Mode, 2 Sheets, Jun. 13, 2003, http://www.dialogweb.com/cgi/dwclient.
Smith, "IBAA Won't Push Interest-Bearing Checking for Business; Says Too Few Members Want It," The American Banker, 2 Sheets, Apr. 18, 1996.
Stafford, "New Bank Program Allows $1 Million in Insured Deposits," Dialog Web Command Mode, 3 Sheets, Aug. 24, 2003, http://www.dialogweb.com/cgi/dwclient.
Wilson, "How Cash Management Services Can Help Your Bank Cultivate New Relationships with Commercial Customers," America's Community Banker, vol. 10, Issue 5, Bell & Howell Information and Learning Company, 8 Sheets, May 1, 2001.
"Man Bites Dog: Funds Move Into Banking," IBC's Money Fund Selector, 2 Sheets, Nov. 6, 1998.
About iMoneyNet, Inc., About iMoneyNet's Money Funds Division, 4 Sheets, Aug. 21, 2003, http://www.ibcdata.com/about.htm.
"Reverse Ups Insurance Limit on Money Market Account," Thomson Financial Inc., Mutual Fund Market News, 1 Sheet, Aug. 26, 2002.
"The Reverse Funds to Offer up to $600,000 of FDIC Insurance on Reserve Insured Deposits; Addressing Investor Needs for Increased Safety, Flexibility and a Competitive Yield," Business Wire, Inc. Business Wire, 2 Sheets, Aug. 13, 2002.
"The Bank of New York adds a $300,000 FDIC-Insured Money Market Account Option to its Dividend Income Checking Account," PR Newswire Associations, Inc., PR Newswire, 2 sheets, Apr. 18, 2002.
The Reserve Fund, Study of U.S. Patent No. 6,374,231, 1 Sheet.
"Bank of Oak Ridge to Offer FDIC Insurance on up to $1.5 Million," Dialog Web Command Mode, 2 Sheets, Sep. 25, 2003, http://www.dialogweb.com/cgi/dwclient.
Reserve Management Corporation, Reserve Insured Deposits, U.S. Appl. No. 76/315,600, Issued.
The Reserve, "What Sets Us Apart," 2 Sheets, Oct. 4, 2006, http://www.ther.com/bank/bank_wsua.shtml.
The Reserve, "Reserve Insured Deposits," 2 Sheets, Oct. 4, 2006 http://www.ther.com/ps/ps_fif.shtml.
The Reserve, "Company History," 3 Sheets, Oct. 4, 2006, http://www.ther.com/aboutus/history.shtml.
The Reserve, "Reserve Insured Deposits Program," 2 Sheets, Oct. 4, 2006, http://www.ther.com/bank/bank_insdep.shtml.
Reserve Insured Deposits, United States Patent and Trademark Office, Reg. No. 2,694,910, Registered Mar. 11, 2003, 1 Sheet.
ABA to Approve System for Sharing Deposit Coverage, American Banker (Feb. 11, 2003).
American Banker Online—New Pitch: Deposit Insurance Sharing, p. 1-4 (Jan. 21, 2003).
Blackwell, Rob, "New Pitch: Deposit Insurance Sharing", American Banker Online, Jan. 21, 2003.
Britt, Phil; "Struggling with Sweep Accounts-,", American's Community Banker, Dec. 1997, v.6, n. 12, p. 18-23.
Certificate of Deposit Registry Service: Keeping deposits in the corn patch; Banknews/Mar. 2003.
Heavyweight Funding, Bankers News, vol. II, Issue 5, p. 1-2 Mar. 4, 2003.
News article: "Regulators Support Demand Deposit Bill-,", Regulatory Compliance Watch,—Mar. 9, 1998; p. 1, vol. 9, No. 10.
Promontory Interfinancial Network; http://www.promnetwork.com/index.html (2003).
Merriam-Webster Online Dictionary, 10th Edition, Definition of "Associated", 2 Sheets.
Merrill Lynch & You, "Financial Services the Way You Want, When You Want Them," Jan. 2000 4 Sheets.
Merrill Lynch, Pierce, Fenner & Smith Incorporated, "Information Statement," 2000, 12 Sheets.
Lawsuit by Island Intellectual Property LLC, Lids Capital LLC, and Double Rock Corporation against Promontory Interfinancial Network, LLC and MBSC Securities Corporation, including Cover Sheet, Summons, Complaint and Rule 7.1 Statement, Case No. 09 CV 2675.

Lawsuit by Island Intellectual Property LLC, Lids Capital LLC, and Double Rock Corporation against Deutsche Bank AG, Deutsche Bank Trust Company Americas and Total Bank Solutions, LLC, including Cover Sheet, Summons, Complaint and Rule 7.1 Statement, Case No. 09 CV 2677.
Lawsuit by Promontory Interfinancial Network, LLC against Double Rock Corporation p/k/a Reserve Management Corporation, Complaint, Civil Action No. 1:09 CV 316.
Lawsuit by Promontory Interfinancial Network, LLC against Double Rock Corporation p/k/a Reserve Management Corporation and Lids Capital LLC, Amended Complaint, Civil Action No. 1:09 CV 316.
CMA, Insured Savings Account Fact Sheet, Merrill Lynch, Pierce, Fenner & Smith Incorporated, 1997, pp. 49-57.
CMA, The Investor Credit Line Service, Cost-Effective Financing for the '90s, Merrill Lynch, Pierce, Fenner & Smith Incorporated, 1997, pp. 36-46.
CMA, The Merrill Lynch Cash Management Account Financial Service, Merrill Lynch, Pierce, Fenner & Smith Incorporated, Jan. 1997, 35 Sheets.
Deposit Growth Strategies for Financial Institutions, New Sweep Account Helps Retain $40 Million in Business Deposits, vol. 7, No. 12, The Reserve Funds, May 2001, 1 Sheet.
FDIC, Federal Deposit Insurance Corporation, Letter to Mr. Ronald Rexter, Feb. 28, 2003, From Michelle M. Borzillo, Counsel Supervision and Legislation Section, 2 Sheets.
Finistar, Providing FDIC Insured Funds as a Stable Source of Deposits to Commercial Banking Institutions, 16 Sheets, www.Finistar.com.
Frost Bank, Member FDIC, Checking Accounts, 1 Sheet, Sep. 19, 2003, https://www.frostbank.com/cgi-bin/ecomm/frost1/scripts/products/product_detail.jsp?BV_....
In the Know, Important Information About Your Account, Smith Barney Citigroup, 2005, 6 Sheets.
Merrill Lynch Announces Beyond Banking, the Power of Advice for Smarter Cash Management, Jan. 8, 2 Sheets.
Merrill Moves CMA Cash to Bank, Street Talk, on Wall Street, Nov. 2000, p. 26.
Money Fund Report, Insured Cash Sweep Options Proliferate, Friday, Jun. 1, 2001, the Reserve Funds, 1 Sheet.
Money Fund Report, Bank of New York Adds Insured Sweeps Option, Friday, May 3, 2002, the Reserve Funds, 1 Sheet.
Money Market Insight's, Goldman Sachs May Create Bank to Offer Insured Cash Sweeps, Aug. 2002 Issue, 3 Sheets.
On Wall Street, Helping Brokers Build a More Successful Business, Unusual Products for Unusual Times, May 2001, 2 Sheets.
On Wall Street, Helping Brokers Build a More Successful Business, the Power of Cash, Jun. 2002, 2 Sheets.
Sweeping Your Firm Into FDIC Insured Deposits, Harken Financial Services, Aug. 4, 2006, 8 Sheets.
Testimony of Bruce R. Bent, CEO of the Reserve Funds, Before the Financial Institutions and Consumer Credit Subcommittee House Financial Services Committee U.S. House of Representative, Hearing on H.R. 758 and H.R. 859, Mar. 5, 2003, 4 Sheets.
The Reserve Funds, NJBA Endorses New Sweep Account Offers New Jersey Banks Deposit Growth, Retention, for Immediate Release, May 23, 2001, 1 Sheet.
The Reserve Funds, Reserve Management and Irwin Union Bank and Trust Company Partner to Offer the Reserve Return Sweep, for Immediate Release, Mar. 8, 2001, 2 Sheets.
The Unmatched Sweep Solution From the Cash Management Expert, 2 Sheets.
Munk, Merrill Makes New Push Into Traditional Banking, Dow Jones Newswires, Jan. 3, 2003, 1 Sheet.
O'Brian, "Money-Market Funds Suit Many Investors, But Proud Creator Frets About Extra Risk," Re-Printed From the Wall Street Journal, Monday, Nov. 6, 2000, Dow Jones & Company, Inc., 2 Sheets.
Waddell, "Sweeping Clean," Advisor, the Advisor to Advisors, 2 Sheets.
Merrill Lynch & You, "Financial Services the Way You Want, When You Want Them," Jan. 2000 4 Sheets.
Merrill Lynch, Pierce, Fenner & Smith Incorporated, "Information Statement," 2000, 12 Sheets.

Online, www.usabancshares.com, Brave New World, 1999, 2 Sheets.

Lawsuit by Island Intellectual Property LLC, Lids Capital. LLC, Double Rock Corporation and Intrasweep LLC, against Promontory Interfinancial Network, LLC, Deutsche Bank AG, Deutsche Bank Trust Company Americas and Total Bank Solutions, LLC, Complaint, Apr. 14, 2009, Case No. 09 CV 3750.

Lawsuit by Promontory Interfinancial Network, LLC against Double Rock Corporation, p/k/a Reserve Management Corporation, Island Intellectual Property LLC and Lids Capital LLC, including Cover Sheet, Summons and Complaint, Apr. 14, 2009, Civil Action No. 3:09 CV 217.

Lawsuit by Promontory Interfinancial Network, LLC against Double Rock Corporation p/k/a Reserve Management Corporation, Island Intellectual Property LLC, Lids Capital LLC and Intrasweep LLC, Amended Complaint, Apr. 15, 2009, Civil Action No. 3:09 CV 217.

Financial Services Industry, "Web Watch: Trading Company Bundles CDs for Better Rates," Community Banker, Jun. 2002, online, http://findarticles.com/p/articles/mi_qa5344/is_200206/ai_n21313883/.

Letter From Joseph A. DiNuzzo, Counsel, Oct. 20, 1999, FDIC, Federal Deposit Insurance Corporation, 1 Sheet.

Letter From Roger A. Hood, Assistant General Counsel, Jul. 16, 1986, FDIC, Federal Deposit Insurance Corporation, Legal Division, 1 Sheet.

The Depository Trust Company, B#: 3875, Oct. 1, 2002, Settlement\Underwriting, From: Denise Russo, Director, Underwriting, 6 Sheets.

Letter to Mr. Jonathan L. Levin, Esq., From Oliver Ireland, Associate General Counsel, Oct. 18, 1996, 2 Sheets.

Letter to Mr. L.P. Fleming, Jr., Esq., From Oliver Ireland, Associate General Counsel, Feb. 7, 1995, 3 Sheets.

Letter to Mr. James E. Creekman, Group Vice President, From Oliver Ireland, Associate General Counsel, Aug. 1, 1995, 4 Sheets.

Letter to Ms. Brenda L. Skidmore, Senior Vice President, From Oliver Ireland, Associate General Counsel, Aug. 30, 1995, 4 Sheets.

Part: 2, Monetary Policy and Reserve Requirements, Subpart—Regulation D, Board Interpretations of Regulation D, Transaction Accounts—Linked to Time Deposits, vol. 1, Federal Reserve Regulatory Service, 2 Sheets.

* cited by examiner

SYSTEMS AND METHODS FOR MANAGING CLIENT ACCOUNTS

CROSS-REFERENCE TO RELATED PATENT APPLICATIONS

This application is a divisional application of application Ser. No. 09/677,535, filed Oct. 2, 2000, which is a continuation-in-part of application Ser. No. 09/176,340, filed 21 Oct. 1998, incorporated herein by reference in their entirety.

BACKGROUND OF THE INVENTION

1. Field of the Invention

This invention generally relates to the field of account transaction processing, and more specifically, an improved system for processing and administering a demand account or money market account in combination with an insured deposit account, and optionally where the accounts are distributed over a plurality of banking institutions.

2. The State of the Art

The Federal Deposit Insurance Corporation ("FDIC") is a federal governmental entity that provides insurance for deposits in most banks and savings institutions in the United States. Bank deposits are insured by the FDIC's Bank Insurance Fund ("BIF") and savings institutions' deposits are insured by the FDIC's Savings Association Insurance Fund ("SAIF"). The rules governing insurance of deposits of institutions insured by the BIF and the SAIF are the same. The FDIC bases insurance coverage on the concept of ownership rights and capacities: funds held in different ownership categories are insured separately from each other; and funds owned by the same entity but held in different accounts are subsumed under the same insurance coverage. The amount of insurance coverage provided to depositors of each institution insured by BIF and SAIF is the same: $100,000.00 to the owners(s) of the funds in the account(s), including principal and interest.

As disclosed in our prior application Ser. No. 09/176,340 referenced above, a system is provided for managing a plurality of demand accounts for multiple clients whose funds are held at a banking institution in a single insured deposit account. That system provides an entity with the ability to deposit funds into a demand account from various sources, and to make payments from the demand account via different instruments, without the limitation as to the number of transfers, and still earn interest on the funds in the clients' accounts because the funds are effectively maintained in a deposit account. Even with the above-mentioned innovative system, investors carrying amounts in excess of $100,000 in their accounts are disadvantaged because the FDIC insurance is limited to $100,000, so any amount over $100,000 is not protected by FDIC insurance. It was with this realization that the present invention was made.

SUMMARY OF THE INVENTION

One object of the present invention is to provide a system for managing a plurality of demand accounts for multiple clients whose funds are held at a banking institution in a single insured deposit account.

Another object of the present invention to is provide a system for managing a plurality of demand accounts for multiple clients whose funds are held at one or more banking institutions in one or more single insured deposit accounts that, from the viewpoint of the investor, removes the $100,000 limitation of FDIC insurance for that individual investor.

Still a further object of the present invention is to provide a system for administering a plurality of accounts containing in excess of $100,000 and continue to qualify for FDIC insurance.

These and other objects are achieved by providing a system that administers individual client deposits to and withdrawals from each of their demand accounts. The system includes a database having each client's information for each account administered. The system monitors the use of the funds from each account by selectively authorizing or rejecting each demand payment request for each account of a particular client. Periodically, net transaction information is determined from the sum of the demand account deposits and withdrawals. The net transaction information is used to determine whether to deposit funds or to withdraw funds from a single deposit account to a client's demand account(s) while updating the database for each client's deposit and authorized demand payment. The system then determines whether each client's account contains more than a specified amount (e.g., $90,000) and distributes any amounts over the specified amount into another account at a preselected banking institution.

In practice, when an investor's account balance exceeds $90,000 in any one account, the excess funds are automatically moved to a second deposit account at another preselected bank. The client will maintain one insured deposit clearance account while the multiple deposit accounts will be transparent to the investor. All transactions to and from the accounts will post to the investor's insured deposit account, although they may be debited from multiple deposit accounts held at various banks. At the time an Insured Deposit Account is opened, the investor is given the option to choose a preferred bank, to chose a list of preferred banks in a desired (or random) order of preference, and to exclude one or more banks. The system will debit and credit the multiple deposit accounts on the investor's behalf, and in the event that the investor does not preselect a bank, the system will automatically designate a bank or banks. The client may also select the order of preference for deposits and withdrawals. For example, if the investor opened his Insured Deposit Account with $170,000, he could also indicate that his assets should be invested in Bank A and Bank C. He may also indicate that bank C is preferred. In this example, $90,000 would be deposited into Bank C and $80,000 into Bank A. If a check were written or the investor chose to redeem funds directly, the withdrawals would be made from Bank A. Withdrawals would not be made from Bank C until all funds had been redeemed from Bank A. Similarly, if the investor chose Bank C as preferred and chose to exclude Bank B, then $90,000 would be deposited into Bank C and $80,000 into Bank A. The investor also can choose the deposit cap for each of multiple banks selected, or can specify deposit caps for default banks chosen by the system (e.g., no bank to hold more than 40% of the investor's funds). Of course, the investor can also specify that all funds be held in a single bank, even if the amount exceeds $100,000. The report the investor receives may refer to all of the assets and transactions in the investor's Insured Clearance Account (a single account), or the investor may be shown a report listing all of the sub-accounts (if any) where the funds are held and in which transactions occurred.

The choice of Banks is held on the investor's account and the system will read the Bank indicator and determine which bank deposit account should be debited or credited. The system will automatically group together all transactions for each bank. At the end of the business day the deposit accounts at the various banks with be either debited or credited. The debit or credit to the deposit account is the net transaction for all activity that occurred that day.

As a result of the present invention the investor earns interest on the balance in his Insured Deposit Account where the interest rate earned can be the same regardless of the bank(s) selected, or may vary depending on the banks selected, while continuing to qualify his account funds for FDIC insurance.

BRIEF DESCRIPTION OF THE DRAWINGS

In the drawings, in which like references characters designate like or corresponding parts throughout the several views, the view are.

DETAILED DESCRIPTION OF THE PREFERRED EMBODIMENTS

The present invention will be described with reference to an administrator, which can be a brokerage firm, a bank, or another financial entity with which clients can institute financial transactions such as deposits and demand payments. The administrator appears to each client as if it were, at least in part, a bank, by accepting deposits for the client's accounts and by authorizing (and then making) payments demanded by the client from his or her account. The funds for all of the clients are pooled into a single deposit account that is maintained as an insured deposit account at a licensed banking institution.

Figure 1A:
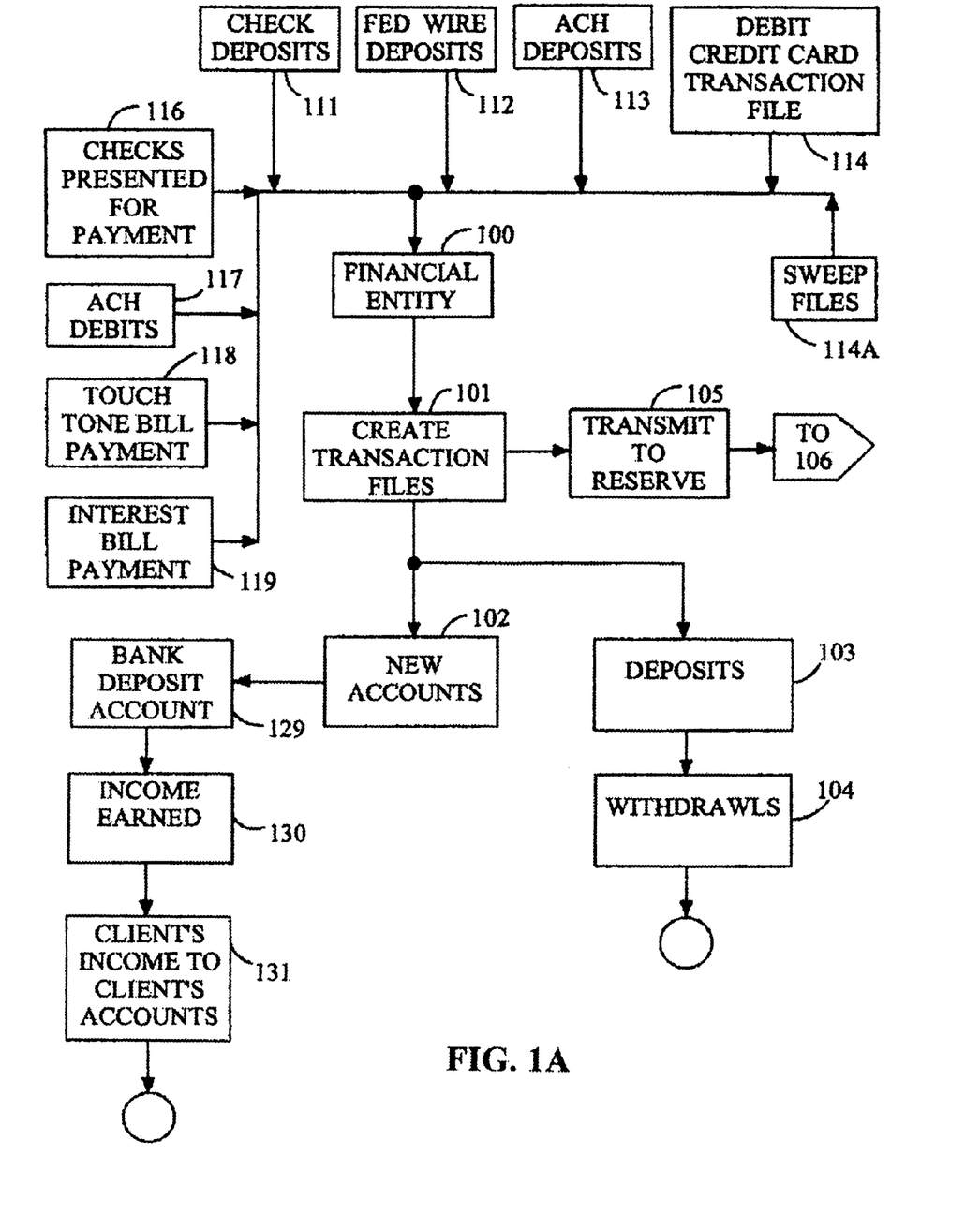
FIG. 1A is a flowchart depicting processing steps the system follows at the administrator's end.

Referring to FIG. 1A, the financial entity 100, which may be a bank, a brokerage or another entity where financial transactions take place or can be facilitated, creates transaction files 101 which are transmitted to Reserve 105; Reserve (or the Reserve System) is the administrator or other entity in charge of administering at least one of the deposit accounts. New account files 102 can be transmitted to Reserve; a new investor account may need to be opened; a new account means organizing and coordinating information to service a new investor for the present system, even though that investor may already be a client of a financial entity 100 for other investment vehicles. A new account 102 becomes part of an existing bank deposit account 129 that collects earned income 130 which transfers the client's income to the client's accounts 131; of course at some time the deposit account must be established with clients' funds. The transaction files represent the addition of funds by check (such as drawn on another institution, or a different demand account from the same institution), wire or electronic transfer, ACH, credits (such as from a debit or credit card merchant), or a sweep from one of the client's other accounts. Accordingly, encompassed in the transaction file are deposits 103 and withdrawals 104. A "sweep" includes the automatic transfer of funds, such as the automated transfer of interest from one account into the client's account, as well as the automated transfer of funds out of the client's account (such as for payment of a securities trade); thus, a sweep may be from one of the client's accounts to another. The responsibility for maintaining the deposit account can be assigned by the administrator to a third party.

Figure 1B:
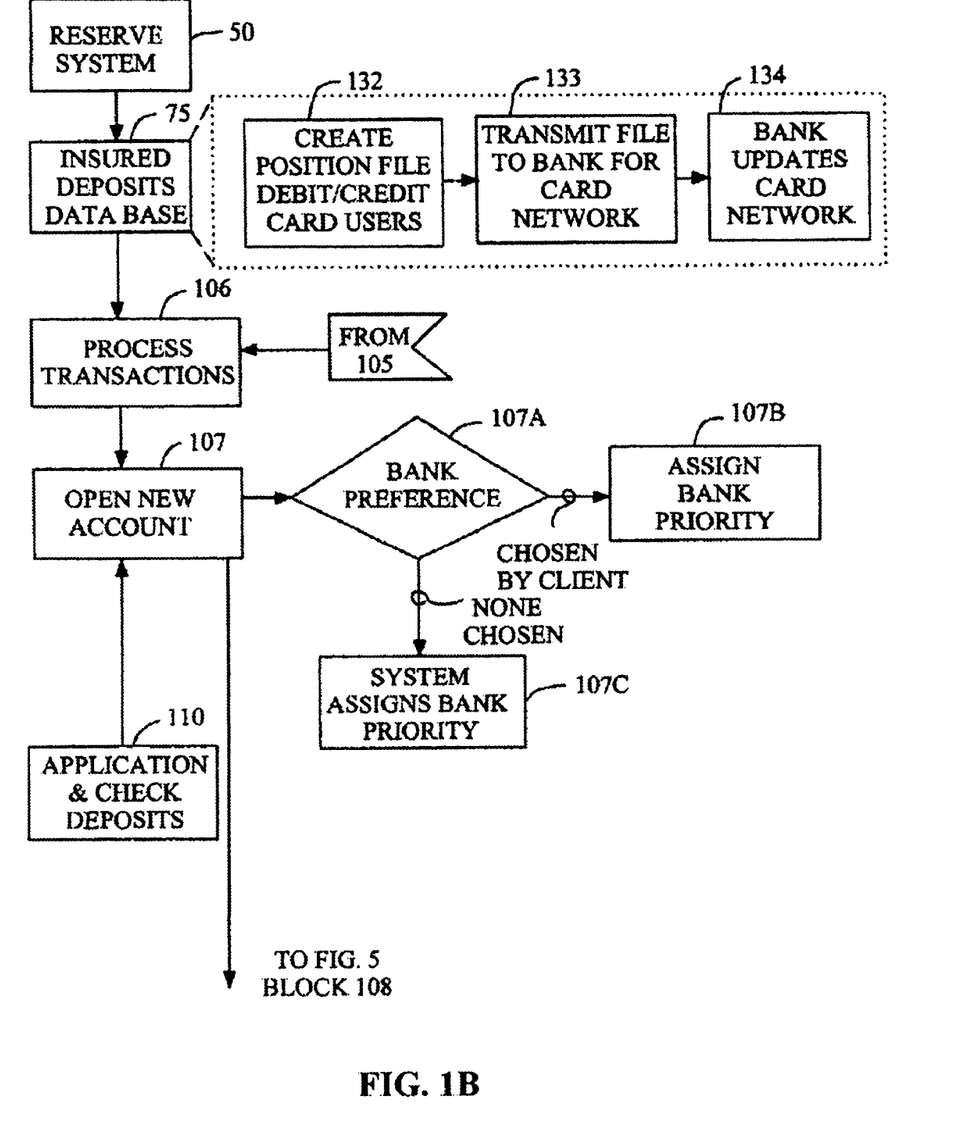
FIG. 1B is a flow chart depicting additional processing steps according to the present invention.

Referring now to FIG. 1B, the Reserve System 50 contains an insured deposit database 75 where a position file for debit/credit card users is created 132 and transmitted to a bank for a debit/credit card network 133 where the bank then updates the network 134. The system updates the data base 75 and processes transactions 106 (from 105, FIG. 1A) and opens a new account 107 where application and check deposits are processed 110. The bank preference 107A is the list of banks and the order of preference for deposits and withdrawals held on the account, including a list of banks to be excluded (if any), and the maximum percentage and/or amount of funds to be held in each bank. The client's bank preference data is added to the account at 107B. If the client does not select values for any of these variables, the system can provide default values for the banks and their order at 107C sufficient for all of the client's funds. When possible the system will not assign a bank that is in the same state in which the client resides.

Figure 2:
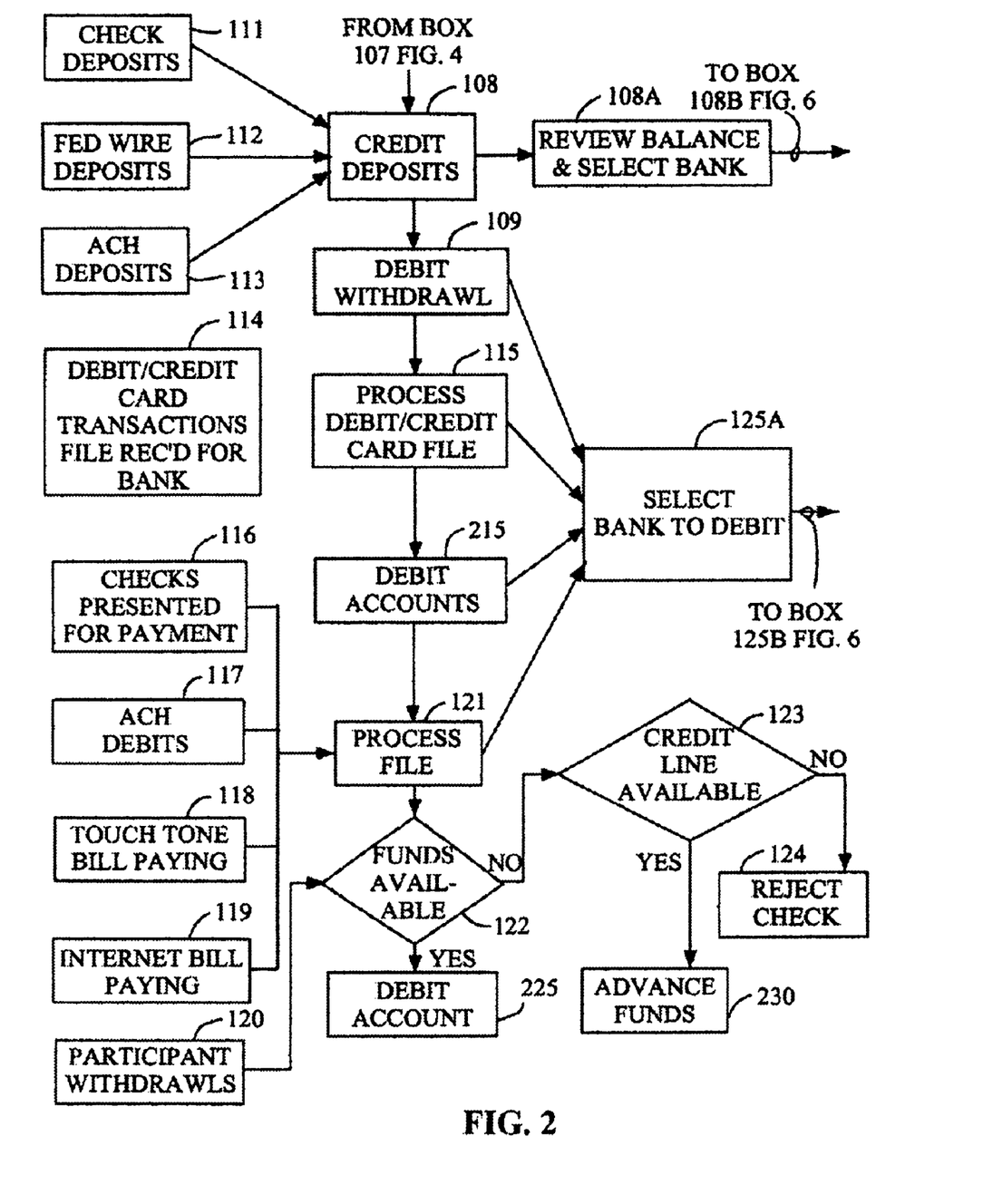
FIG. 2 is a flowchart depicting processing steps regarding the determination of a available funds according to the present invention.
Figure 3:
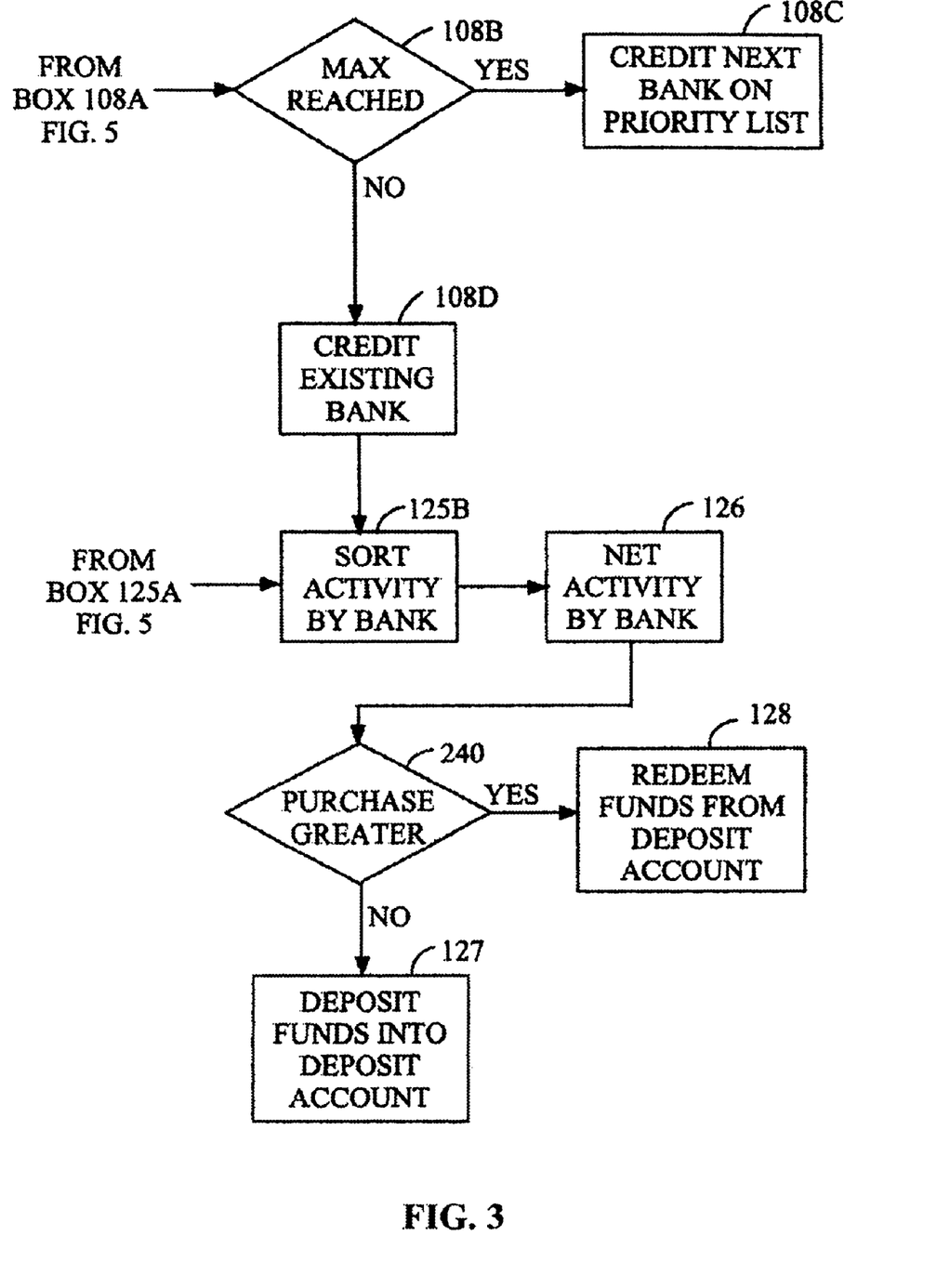
FIG. 3 is a flow chart depicting processing steps associated with the completion of the banking system process according to the present invention.

Referring to FIG. 2 it can be seen that when a deposit, either a check deposit 111, federal wire deposit 112, ACH deposit, sweep, or other deposit is credited to the client's account 108, the system will review where the existing funds of the accounts are deposited 108A. If the client's balance has reached the maximum allowable balance for the existing bank 108B, as shown in FIG. 3, the system will then select the next bank on the preference list attached to the account 108C. If the maximum allowable balance has not been reached in the existing bank, the system will credit the additional funds to that bank 108D.

Still referring to FIG. 2, the procedure for processing withdrawals can be seen. Various methods of withdrawing funds are debit withdrawal 109, processing debit or credit card transactions such as debit/credit card files 115, direct debit accounts 215, and processing of files 121. Processing of a debit/credit card file 115 utilizes data accumulated from debit/credit card transactions received from the banks 114. The processing of file 121 procedure utilizes one of various sources of data such as a check presented for payment 116, ACH debits 117, touch tone bill paying 118, and/or internet bill paying 119.

After processing the debit procedure, the system will review the bank preference list and select the appropriate bank to debit 125A. The system will sort all the daily transactions by the bank 125B (see FIG. 3). The activity for each bank will then be netted 126 and the appropriate deposit or withdrawals made.

The system will then determine whether funds are available 122, which function is also associated with other participant withdrawals 120. If the funds are available, the account is debited 225. If the funds are not available, however, the system determines whether a credit line is available 123. If a credit line is available, then funds are advanced 230 to cover the debit; if not the transaction is rejected 124.

Referring to FIG. 3, as previously stated the system determines whether the client's balance reaches its maximum 108B and if so the next bank on the list selected by the client is credited 108C. If the maximum is not reached the existing bank is credited 108D. Information and activities associated with processed debits and credits of the client's accounts from 125A are sorted by the bank 125B and the net activity by the bank is determined 126. The system then determines whether the deposits and credits were greater than the withdrawals and debits 240 and if so, the excess funds are deposited into a deposit account 127. If the debits and withdrawals were greater than the credits the difference is redeemed from the deposit account 128.

Thus, by practicing this invention, the client is provided with FDIC insurance in excess of $100,000.00 because the client's holdings are maintained in multiple insured deposit accounts, which may be in multiple banks.

The foregoing description is meant to be illustrative and not limiting. Various changes, modifications, and additions may become apparent to the skilled artisan upon a perusal of this specification, and as such are meant to be within the scope and spirit of the invention as defined by the claims.

What is claimed is:

1. A computer system for managing a plurality of client transaction accounts associated with a plurality of respective clients for a plurality of transactions, said system comprising:
   one or more electronic databases, stored on one or more computer-readable media, comprising:
      (i) client account information for each of the respective client transaction accounts;
      (ii) aggregated transaction account information for a plurality of Federal Deposit Insurance Corporation (FDIC)-insured and interest-bearing aggregated deposit accounts held in a plurality of banks in a program, wherein funds from client transaction accounts of a plurality of clients are aggregated with funds of other client transaction accounts in the aggregated deposit accounts held in the banks in the program; and
      (iii) information on each client's funds held in said plurality of the insured and interest-bearing aggregated deposit accounts; and
   one or more computers comprising memory wherein the memory stores computer-readable instructions that, when executed, cause the one or more computers to perform the steps:
   (a) administering clients' deposits/transfers to and withdrawals/transfers from each of said client transaction accounts, said administering comprising processing transaction data comprising data for one or more deposits/transfers for one or more client transaction accounts and transaction data for each of more than six (6) withdrawals/transfers to be paid to third parties by check and/or debit cards, within a month from each of a plurality of said client transaction accounts, with the transaction data comprising a respective amount for each respective withdrawal/transfer;
   (b) determining on a regular basis, one or more net transactions for a plurality of clients' accounts for a plurality of said clients comprising a sum of said plurality of clients' deposits/transfers to and/or withdrawals/transfers from a plurality of said respective client transaction accounts;
   (c) determining, based on one or more of said net transactions, whether to deposit/transfer funds to or withdraw/transfer funds from said one or more FDIC-insured and interest-bearing aggregated deposit accounts, comprising:
      (i) determining whether each client's funds held in one of the banking institutions in the one or more FDIC-insured interest bearing aggregated deposit accounts held therein is more than a specified amount; and
      (ii) generating data for distribution of any amounts over said specified amount into at least one other FDIC-insured interest bearing aggregated deposit account at least one other of the banking institutions in which the total of said client's funds will not exceed the specified amount;
   (d) processing, during the month, needed deposits/transfers to, or needed withdrawals/transfers from said one or more FDIC-insured and interest-bearing aggregated deposit accounts based on one or more of the net transactions, so that more than six (6) withdrawals/transfers are made during a month from at least one of said FDIC-insured and interest-bearing aggregated deposit accounts; and
   (e) updating one or more of the electronic databases with each client's deposits/transfers to and withdrawals/transfers from said each client's respective transaction account.

2. The system of claim 1, wherein the computer-readable instructions, when executed, cause one or more of the computers to perform the steps of making more than six (6) withdrawals/transfers during a month from each of two of said FDIC-insured interest-bearing aggregated deposit accounts.

3. The system of claim 1, wherein the computer-readable instructions, when executed, cause one or more of the computers to perform the steps of making more than six (6) withdrawals/transfers during a month from only one of said FDIC-insured interest-bearing aggregated deposit accounts.

4. The system of claim 1, wherein the computer-readable instructions, when executed, cause one or more of the computers to perform the steps of
   causing distribution of interest from said FDIC-insured interest-bearing aggregated deposit accounts to said client transaction accounts; and
   updating the database based on interest distributed to and client's deposits/transfers to and withdrawals/transfers from each of their respective transaction accounts.

5. The system of claim 1, wherein the computer-readable instructions, when executed, cause one or more of the computers to perform the step of generation of one or more instructions to facilitate one or more of said withdrawals/transfers from at least one of said one or more FDIC-insured interest-bearing aggregated deposit accounts to be requested in person.

6. The system of claim 1, wherein the computer-readable instructions, when executed, cause one or more of the computers to perform the step of generation of one or more instructions to facilitate one or more of said withdrawals/transfers from at least one of said one or FDIC-insured interest-bearing aggregated deposit accounts to be requested by mail.

7. The system of claim 1, wherein the computer-readable instructions, when executed, cause one or more of the computers to perform the step of generation of one or more instructions to facilitate one or more of said withdrawals/transfers from at least one of said one or more FDIC-insured interest-bearing aggregated deposit accounts to be requested by messenger.

8. The system of claim 1, wherein the computer-readable instructions, when executed, cause one or more of the computers to perform the step of generation of one or more instructions to facilitate one or more of said withdrawals/transfers from at least one of said one or more FDIC-insured interest-bearing aggregated deposit accounts to be requested by telephone and distributed by mail.

9. The system of claim 1, wherein the computer-readable instructions, when executed, cause one or more of the computers to perform the step of generation of one or more instructions to facilitate one or more of said withdrawals/transfers from at least one of said one or more FDIC-insured interest-bearing aggregated deposit accounts to be requested by automated teller machine.

10. The system of claim 1, wherein the one or more electronic databases maintain aggregated transaction account information for a plurality of FDIC-insured and interest-bearing aggregated deposit accounts held in a fixed number of banks in the program, and
  wherein the steps are performed using the fixed number of banks in the program.

11. The system of claim 1,
  wherein one or more of the electronic databases includes client preference and/or exclusion information comprising a client's one or more preferences and/or one or more exclusions of one or more banks to hold its funds; and
  wherein the computer-readable instructions stored in the memory determines the other bank in the program for distribution of the deposit/transfer, when the balance of funds for the respective client in the aggregated deposit account at the one banking institution equals or exceeds the specified amount, based at least in part on the client preference and/or exclusion information.

12. The system of claim 1, wherein the computer-readable instructions, when executed, cause one or more of the computers to perform the step of depositing/transferring of client funds to said client transaction accounts by at least one method selected from the group consisting of check, draft, wire transfer, ACH credit, third party credits, and a sweep from another account.

13. The system of claim 1,
  wherein the client account information for each of the respective client transaction accounts comprises a maximum percentage of client funds to be deposited in each of a first plurality of the banking institutions, and
  wherein the determining, based on one or more of said net transactions, whether to deposit/transfer funds to or withdraw/transfer funds from said one or more FDIC-insured and interest-bearing aggregated deposit accounts, comprises makes the determination so that no more than the maximum percentage for the respective client of the respective client funds for deposit is deposited in an aggregated deposit account in each of the first plurality of the banking institutions.

* * * * *